(12) United States Patent
Hofmann et al.

(10) Patent No.: US 7,500,045 B2
(45) Date of Patent: Mar. 3, 2009

(54) MINIMIZING MEMORY BARRIERS WHEN ENFORCING STRONGLY-ORDERED REQUESTS IN A WEAKLY-ORDERED PROCESSING SYSTEM

(75) Inventors: Richard Gerard Hofmann, Cary, NC (US); James Norris Dieffenderfer, Apex, NC (US); Thomas Sartorius, Raleigh, NC (US); Thomas Philip Speier, Holly Springs, NC (US); Jaya Prakash Subramaniam Ganasan, Youngsville, NC (US)

(73) Assignee: QUALCOMM Incorporated, San Diego, CA (US)

( * ) Notice: Subject to any disclaimer, the term of this patent is extended or adjusted under 35 U.S.C. 154(b) by 147 days.

(21) Appl. No.: 11/254,939

(22) Filed: Oct. 20, 2005

(65) Prior Publication Data

US 2006/0218335 A1 Sep. 28, 2006

Related U.S. Application Data

(60) Provisional application No. 60/665,000, filed on Mar. 23, 2005.

(51) Int. Cl.
*G06F 13/36* (2006.01)
*G06F 12/00* (2006.01)
(52) U.S. Cl. .................. 710/311; 710/308; 710/310; 710/315; 711/152
(58) Field of Classification Search .................. 710/305
See application file for complete search history.

(56) References Cited

U.S. PATENT DOCUMENTS

| | | | |
|---|---|---|---|
| 6,038,646 A | * | 3/2000 | Sproull .................. 711/158 |
| 6,047,334 A | * | 4/2000 | Langendorf et al. ............ 710/5 |
| 6,088,771 A | | 7/2000 | Steely, Jr. et al. |
| 6,275,913 B1 | | 8/2001 | Jeddeloh |
| 6,370,632 B1 | | 4/2002 | Kikuta et al. |
| 6,385,705 B1 | | 5/2002 | Keller et al. |
| 6,609,192 B1 | | 8/2003 | Guthrie et al. |

(Continued)

FOREIGN PATENT DOCUMENTS

JP 04 190435 A 7/1992

(Continued)

OTHER PUBLICATIONS

International Search Report-PCT/US06/010953, International Search Authority-European patent Office-Aug. 17, 2006.

*Primary Examiner*—Paul R. Myers
*Assistant Examiner*—Ryan M Stiglic
(74) *Attorney, Agent, or Firm*—Nicholas J. Pauley; Joseph B. Agusta; Peter Kamarchik

(57) ABSTRACT

The disclosure is directed to a weakly-ordered processing system and method for enforcing strongly-ordered memory access requests in a weakly-ordered processing system. The processing system includes a plurality of memory devices and a plurality of processors. A bus interconnect is configured to interface the processors to the memory devices. The bus interconnect is further configured to enforce an ordering constraint for a strongly-ordered memory access request from an originating processor to a target memory device by sending a memory barrier to each of the other memory devices accessible by the originating processor, except for those memory devices that the bus interconnect can confirm have no unexecuted memory access requests from the originating processor.

21 Claims, 4 Drawing Sheets

U.S. PATENT DOCUMENTS

| | | |
|---|---|---|
| 6,963,967 B1 * | 11/2005 | Guthrie et al. .............. 712/225 |
| 6,976,115 B2 * | 12/2005 | Creta et al. ................. 710/310 |
| 2002/0194436 A1 * | 12/2002 | McKenney .................. 711/152 |
| 2003/0131175 A1 | 7/2003 | Heynemann et al. |
| 2003/0188072 A1 * | 10/2003 | Creta et al. ................. 710/306 |
| 2006/0218335 A1 * | 9/2006 | Hofmann et al. ............ 710/316 |
| 2006/0218358 A1 * | 9/2006 | Hofmann et al. ............ 711/151 |
| 2008/0059683 A1 * | 3/2008 | Sullivan et al. ............. 710/306 |

FOREIGN PATENT DOCUMENTS

WO  WO 2006102636 A1 *  9/2006

* cited by examiner

MINIMIZING MEMORY BARRIERS WHEN ENFORCING STRONGLY-ORDERED REQUESTS IN A WEAKLY-ORDERED PROCESSING SYSTEM

CROSS-REFERENCE TO RELATED APPLICATION

This application contains subject matter related to application Ser. No. 11/253,307, filed Oct. 9, 2008.

The present application for patent claims priority to Provisional Application No. 60/665,000 entitled "Method and Apparatus for Supressing Unnecessary Memory Barrier Bus Operations" filed Mar. 23, 2005, and assigned to the assignee hereof and hereby expressly incorporated by reference herein.

BACKGROUND

1. Field

The present disclosure relates generally to processing systems, and more particularly, to a method and apparatus for minimizing memory barriers when enforcing strongly-ordered requests in a weakly-ordered processing system.

2. Background

Computers and other modern processing systems have revolutionized the electronics industry by enabling sophisticated tasks to be performed with just a few strokes of a keypad. These sophisticated tasks often involve a number of devices that communicate with one another in a fast and efficient manner using a bus. The bus provides a shared communication link between devices in a processing system.

The types of devices connected to a bus in a processing system may vary depending on the particular application. Typically, the sending devices on the bus may be processors, and the receiving devices on the bus may be memory devices or memory mapped devices. In these systems, the processors often achieve performance benefits by allowing memory operations to be performed out-of-order. For example, a sequence of memory operations could be reordered to allow all operations to the same page in memory to be executed before a new page is opened. Processing systems that are allowed to reorder memory operations are generally referred to as "weakly-ordered" processing systems.

In certain instances, the reordering of memory operations may unpredictably affect program behavior. For instance, an application may require a processor to write data to memory before the processor reads from that memory location. In a weakly-ordered processing system, there is no guarantee that this will occur. This result may be unacceptable.

Various techniques have been employed for executing ordered memory operations in a weakly-ordered processing system. One technique is simply to delay certain memory operations until all memory operations before it are executed. In the previous example, the processor may delay issuing a read request until it receives an indication that guarantees that the data has been written to the memory location. Another technique is to use a bus command referred to as a memory barrier when an ordered memory operation is required. A "memory barrier" may be used to ensure that all memory access requests issued by a processor before the memory barrier are executed before all memory access requests issued by the processor after the memory barrier. Again, in the previous example, a memory barrier could be sent to the memory by the processor before issuing a read request. This would ensure that the processor writes to memory before it reads from the same memory location.

Both techniques are effective, but inefficient from a system performance perspective. The memory barrier may be particularly inefficient in processing systems with multiple memory devices. In these processing systems, a memory barrier would need to be issued by the processor to every memory device it can access to enforce an ordering constraint on memory operations. Thus, there is a continuing need for more efficient methods to perform ordered memory operations in a weakly-ordered processing system.

SUMMARY

One aspect of a weakly-ordered processing system is disclosed. The processing system includes a plurality of memory devices, a plurality of processors, each of the processors configured to generate memory access requests to one or more of the memory devices, and a bus interconnect configured to interface the processors to the memory devices. The bus interconnect is further configured to enforce an ordering constraint for a strongly-ordered memory access request from an originating processor to a target memory device by sending a memory barrier to each of the other memory devices accessible by the originating processor, except for those memory devices that the bus interconnect can confirm have no unexecuted memory access requests from the originating processor.

Another aspect of a weakly-ordered processing system is disclosed. The wealky-ordered system includes a plurality of memory devices, a plurality of processors, each of the processors configured to generate memory access requests to one or more of the memory devices, and a bus interconnect. The bus interconnect includes means for interfacing the processors to the memory devices, and means for enforcing an ordering constraint for a strongly-ordered memory access request from an originating processor to a target memory device by sending a memory barrier to each of the other memory devices accessible by the processor, except for those memory devices that the bus interconnect can confirm have no unexecuted memory access requests from the originating processor.

An aspect of a bus interconnect is disclosed. The bus interconnect includes a bus switch configured to interface a plurality of processors to a plurality of memory devices in a weakly-ordered processing system, each of the processors configured to generate memory access requests to one or more of the memory devices, and a controller configured to enforce an ordering constraint for a strongly-ordered memory access request from an originating processor to a target memory device by sending a memory barrier to each of the other memory devices accessible by the originating processor, except for those memory devices that the controller can confirm have no unexecuted memory access requests from the originating processor.

An aspect of a method of enforcing strongly-ordered memory access requests in a weakly-ordered processing system is disclosed. The method includes receiving, from a plurality of processors, memory access requests for a plurality of memory devices, one of the memory access requests from an originating processor to a target memory device being a strongly-ordered request, and enforce an ordering constraint for the strongly-ordered memory access request by sending a memory barrier to each of the other memory devices accessible by the originating processor, except for those memory devices in which it can be confirmed that there are no unexecuted memory access requests from the originating processor.

It is understood that other embodiments of the present invention will become readily apparent to those skilled in the art from the following detailed description, wherein it is shown and described only various embodiments of the invention by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Various aspects of the present invention are illustrated by way of example, and not by way of limitation, in the accompanying drawings, wherein.

DETAILED DESCRIPTION

The detailed description set forth below in connection with the appended drawings is intended as a description of various embodiments of the invention and is not intended to represent the only embodiments in which the invention may be practiced. The detailed description includes specific details for the purpose of providing a thorough understanding of the invention. However, it will be apparent to those skilled in the art that the invention may be practiced without these specific details. In some instances, well known structures and components are shown in block diagram form in order to avoid obscuring the concepts of the invention.

Figure 1:
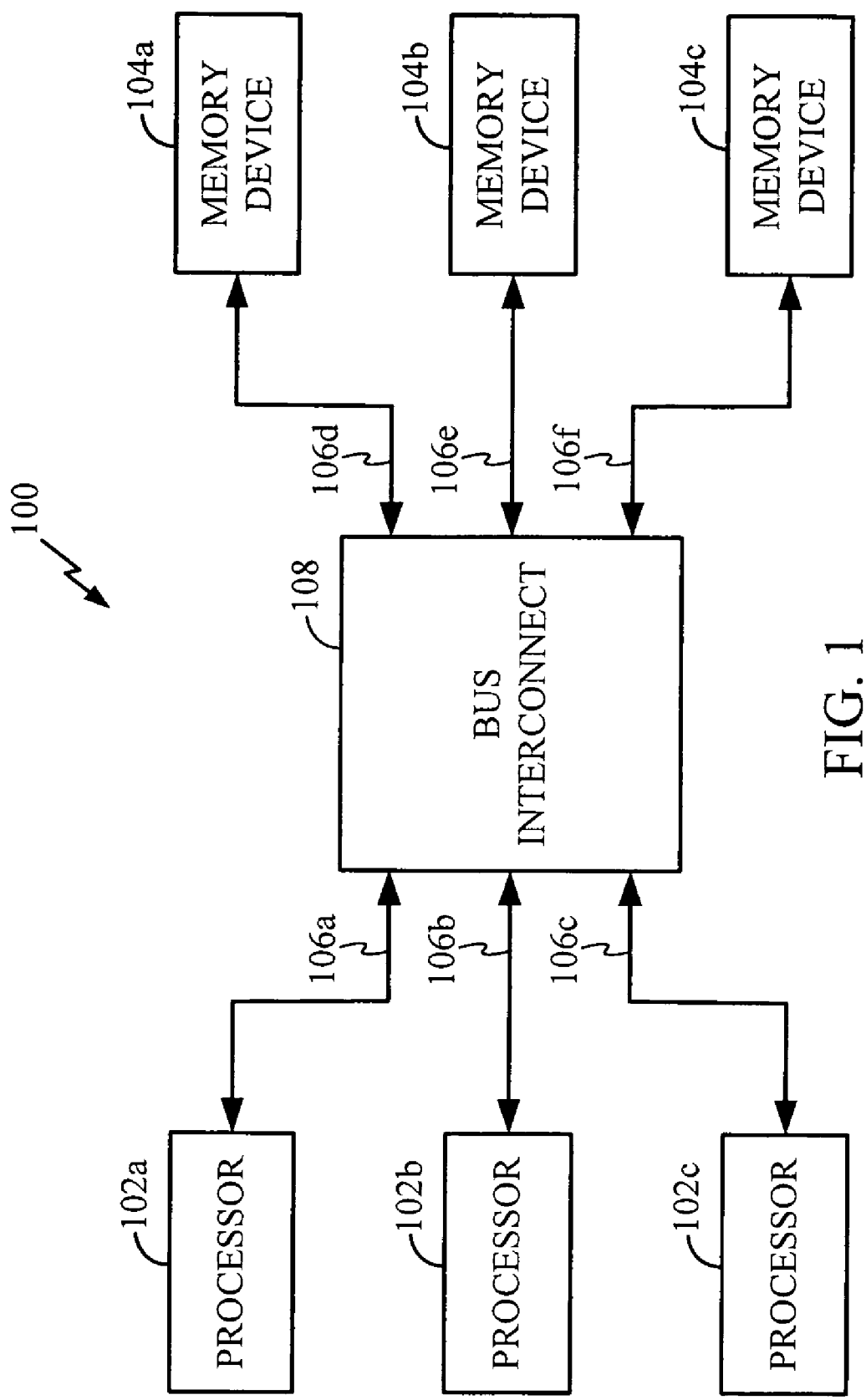
FIG. 1 is a conceptual block diagram illustrating an example of a weakly-ordered processing system.

FIG. 1 is a conceptual block diagram illustrating an example of a weakly-ordered processing system. The processing system 100 may be a computer, resident in a computer, or any other system capable of processing, retrieving and storing information. The processing system 100 may be a stand-alone system, or alternatively, embedded in a device, such as a wireless or wired telephone, a personal digital assistant (PDA), a desktop computer, a laptop computer, a game console, a pager, a modem, a camera, automotive equipment, industrial equipment, video equipment, audio equipment, or any other suitable device requiring processing capability. The processing system 100 may be implemented as integrated circuit, part of an integrated circuit, or distributed across multiple integrated circuits. Alternatively, the processing system 100 may be implemented with discrete components, or any combinations of discrete or integrated circuitry. Those skilled in the art will recognize how best to implement the processing system 100 for each particular application.

The processing system 100 is shown with multiple processors 102a-102c in communication with multiple memory devices 104a-104c over a bus 106. The actual number of processors and memory devices required for any particular application may vary depending on the computational power required and the overall design constraints. A bus interconnect 108 may be used to manage bus transactions between the processors 102a-102c and memory devices 104a-104c using point-to-point switching connections. In at least one embodiment of the bus interconnect 108, multiple direct links may be provided to allow several bus transactions to occur simultaneously.

Each processor 102a-102c may be implemented as any type of bus mastering device including, by way of example, a general purpose processor, a digital signal processor (DSP), application specific integrated circuit (ASIC), a field programmable gate array (FPGA) or other programmable logic, discrete gate or transistor logic, discrete hardware components, or any other processing entity or arrangement. One or more of the processors 102a-102c may be configured to execute instructions under control of an operating system or other software. The instructions may reside in one or more of the memory devices 104a-104c. Data may also be stored in the memory devices 104a-104c, and retrieved by the processors 102a-102c to execute certain instructions. The new data resulting from the execution of these instructions may be written back into the memory devices 104a-104c. Each memory device 104a-104c may include a memory controller (not shown) and a storage medium (not shown). The storage medium may include RAM memory, DRAM memory, SDRAM memory, flash memory, ROM memory, PROM memory, EPROM memory, EEPROM memory, CD-ROM, DVD, registers, hard disk drive, a removable disk, or any other suitable storage medium.

Each processor 102a-102c may be provided with a dedicated channel 106a-106c on the bus 106 for communicating with the bus interconnect 108. Similarly, the bus interconnect 108 may use a dedicated channel 106d-106f on the bus to communicate with each memory device 104a-104c. By way of example, a first processor 102a can access a target memory device 104b by sending a memory access request over its dedicated channel 106a on the bus 106. The bus interconnect 108 determines the target memory device 104b from the address of the memory access request and forwards the request to the target memory device 104b over the appropriate channel 106e on the bus 106. A "memory access request" may be a write request, a read request, or any other bus related request. An originating processor 102a-102c may issue a write request to a target memory device 104a-104c by placing the appropriate address with the payload on the bus 106 and asserting a write enable signal. An originating processor 102a-102c may issue a read request to a target memory device 104a-104c by placing the appropriate address on the bus 106 and asserting a read enable signal. In response to the read request, the target memory device 104a-104c will send the payload back to the originating processor 102a-102c.

In at least one embodiment of the processing system 100, the processors 102a-102c may transmit a "memory attribute" with each memory access request. The "memory attribute" may be any parameter that describes the nature of the memory access request. The memory attribute may be transmitted with the address over the address channel. Alternatively, the memory attribute may be transmitted using sideband signaling or some other methodology. The memory attribute may be used to indicate whether or not the memory access request is strongly-ordered. A "strongly-ordered" request refers to a memory access request that cannot be executed out of order.

The bus interconnect 108 may be used to monitor the memory attribute for each memory access request from the processors 102a-102c. If a memory attribute indicates a strongly-ordered memory access request, the bus interconnect 108 may enforce an ordering constraint on that request. By way of example, a memory access request from a first processor 102a to a target memory device 104a may include a memory attribute. The bus interconnect 108 may determine from the memory attribute whether the request is strongly-ordered. If the bus interconnect 108 determines that the request is strongly-ordered, it sends a memory barrier to every memory device 104b and 104c that the first processor 102a is capable of accessing, other than the target memory device 104a. The bus interconnect 108 also sends the memory access request to the target memory 104a without a memory barrier because the target memory device 104a will implicitly handle it as a strongly-ordered request due to the memory attribute associated with the memory access request.

Figure 2:
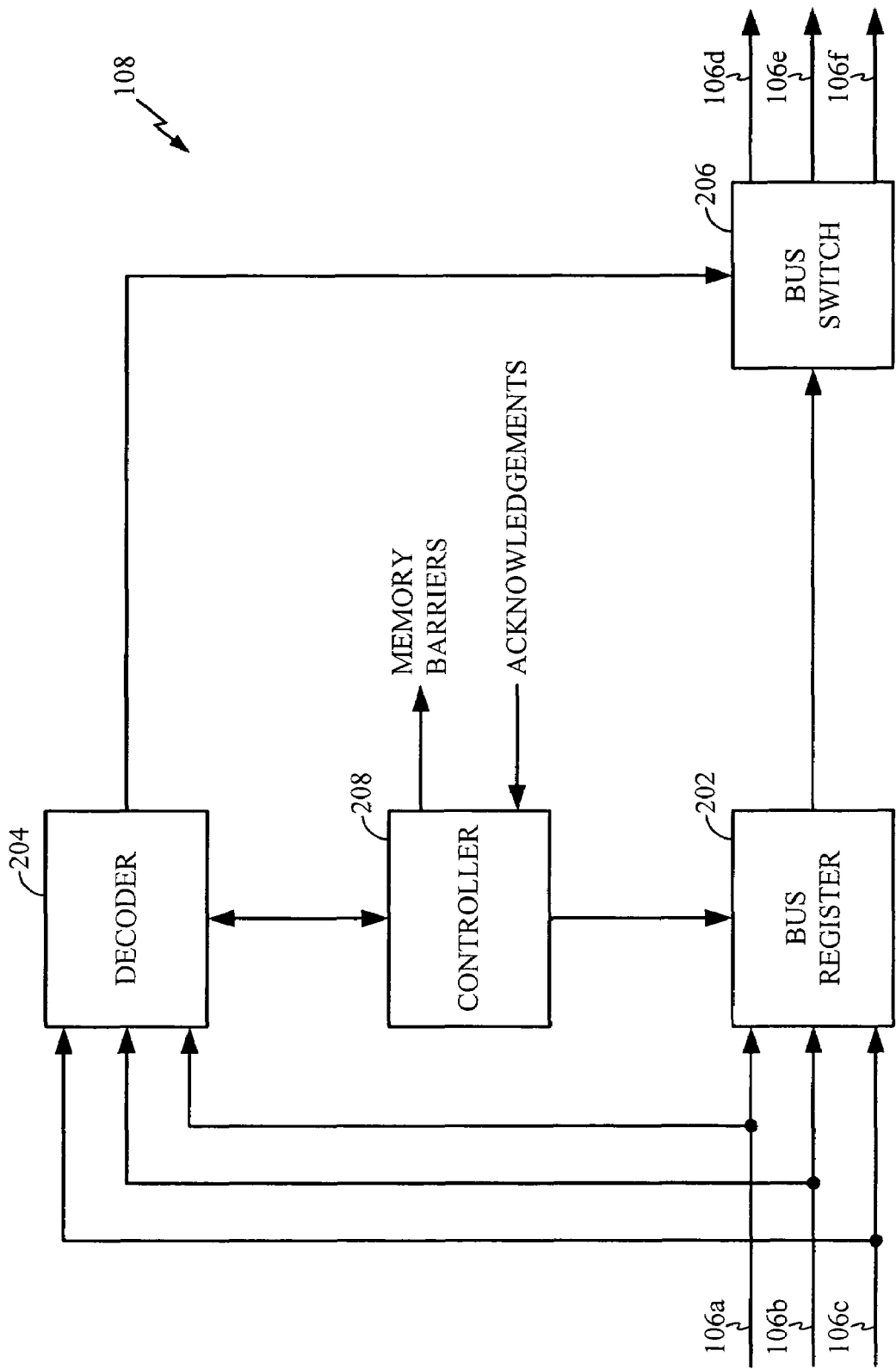
FIG. 2 is a functional block diagram illustrating an example of a bus interconnect in a weakly-ordered processing system.

FIG. 2 is a functional block diagram illustrating an example of a bus interconnect in a weakly-ordered processing system. The manner in which the bus interconnect is actually implemented will depend upon design considerations. Those skilled in the art will recognize the interchangeability of various designs, and how best to implement the functionality described herein for each particular application.

Referring to FIG. 2, a bus register 202 may be used to receive and store information from the bus 106. The bus register 202 may be any type of storage device such as a first-in-first-out (FIFO) memory, or other suitable storage device. The information received and stored by the bus register 202 may be any bus related information, but typically includes the address and memory attribute for each memory access request, and in the case of a write request, the payload. The address for each memory access request is also provided to a decoder 204. The decoder 204 may be used to determine the target memory device for each memory access request in the bus register 202. This determination is used to control a bus switch 206. The bus switch 206 is used to demultiplex each memory access request in the bus register 202 to the appropriate channel of the bus 106 for its target memory device. A controller 208 may be used to control the timing of the memory access requests released from the bus register 202.

Figure 3:
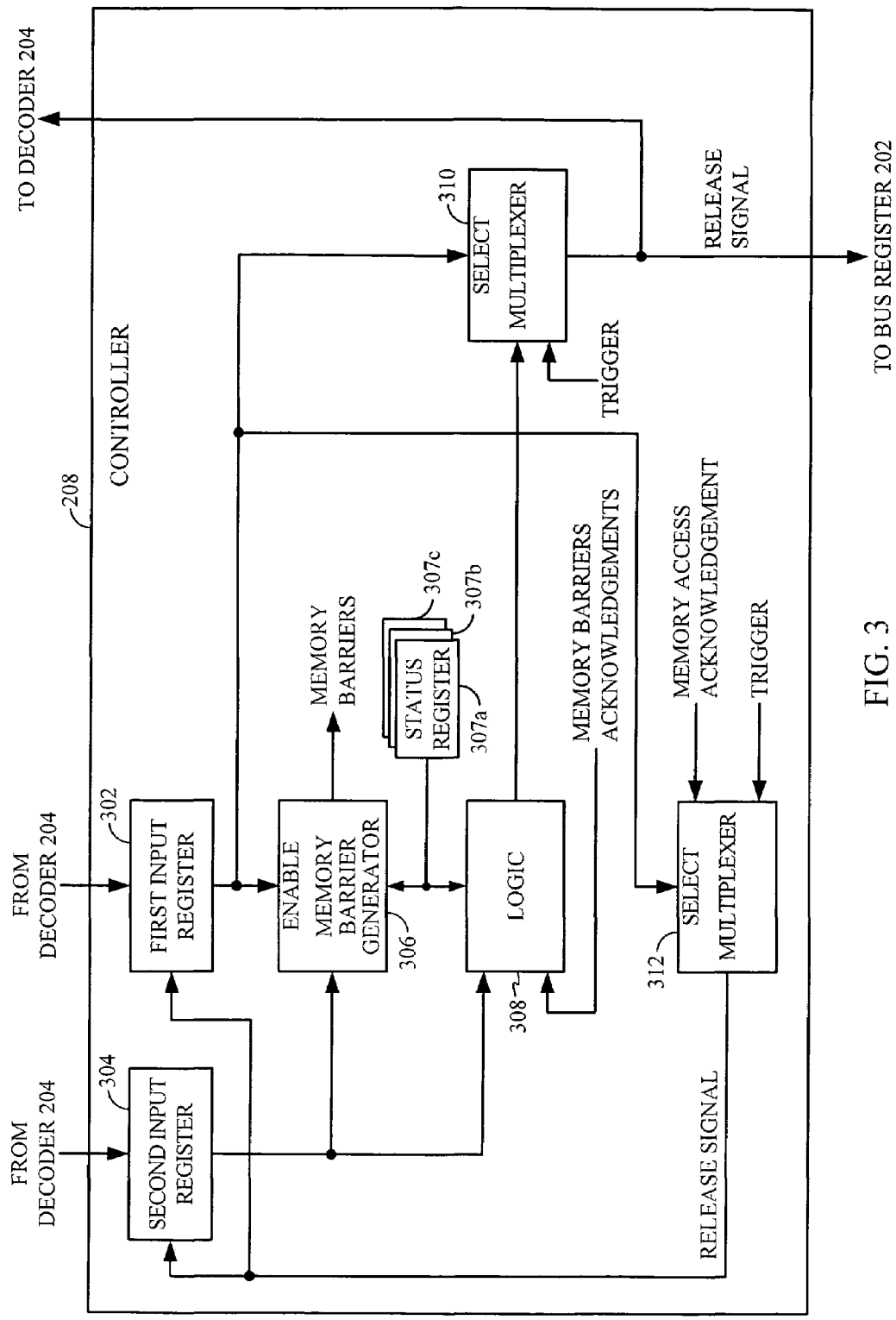
FIG. 3 is a functional block diagram illustrating an example of a controller in a bus interconnect for a weakly-ordered processing system.

FIG. 3 is a functional block diagram illustrating an example of a controller in a bus interconnect for a weakly-ordered processing system. The controller 208 enforces ordering constraints on memory operations based on information it receives from the decoder 204. The information may include the memory attribute for each memory access request, which may be stored in a first input register 302. The information may also include data that identifies each memory device, other than the target memory device, that the originating processor is capable of accessing. The particular memory devices accessible by each processor are preconfigured during the design stage, and therefore, can be programmed or hard wired into the decoder 204. In any event, a second input register 304 may be used to store this information. The first and second input registers 302, 304 may be separate registers as shown in FIG. 2, or alternatively a single register. In some embodiments of the controller 208, the information from the decoder 204 may be stored in registers shared with other bus interconnect functions. Each register may be a FIFO or any other suitable storage medium.

The controller 208 enforces ordering constraints on memory operations by controlling the timing of memory access requests released from the bus register 202. The process will first be described in connection with a memory attribute which indicates that a strongly-ordered memory access request is ready to be released from the bus register 202. In this case, the memory attribute is provided from the first input register 302 to a memory barrier generator 306 as an enabling signal. At the same time, the data stored in the second input register 304 is provided to the input of the memory barrier generator 306. As indicated above, the data stored in the second input register 304 includes data that identifies each memory device, other than the target memory device, that the originating processor is capable of accessing. When the memory barrier generator 306 is enabled by the memory attribute, this information is used to generate a memory barrier for each memory device identified by the data. Each memory barrier may be provided to the appropriate memory device by issuing a bus command with an attribute identifying the originating processor which initiated the strongly-ordered request. Alternatively, the memory barriers may be provided to the appropriate memory devices using sideband signaling, or by other suitable means.

The memory barrier generator 306 may be used to suppress unnecessary memory barriers. For instance, a memory barrier for a memory device accessible by the originating processor may be suppressed if the memory device does not have an outstanding request from the originating processor to execute. This may be achieved in a variety of ways. In one embodiment of the controller 208, a separate status register may be assigned to monitor the activities of each memory device. In this embodiment, a first status register 307a monitors the activities of the first memory device 104a, a second status register 307b monitors the activities of the second memory device 104b, and a third status register 307c monitors the activities of the third memory device 104c (see FIG. 1). Each status register 307a-307c includes a number of status signals. In one embodiment of the controller, the status signals constitute status bits, one corresponding to each processor that can access the memory devices assigned to a particular status bit. The status bit is used to indicate whether or not its corresponding processor has issued a memory access request that remains unexecuted by the memory device assigned to the register storing such bit.

Referring to FIGS. 1-3, an example will now be provided to illustrate the manner in which the status bits can be used to suppress memory barriers. In this example, the processing system may be configured such that the first processor 102a can access the first and third memory devices 104a, 104c. As a result of this configuration, the first and third status registers 307a, 307c in the controller 208 each includes a status bit for the first processor 102a. When a strongly-ordered request issued by the first processor 102a to the first memory device 104a is at the output of the bus register 202, the corresponding memory attribute from the first input register 302 enables the memory barrier generator 306. The data provided to the memory barrier generator 306 from the second input register 304 identifies the memory devices, other than the target memory device, that the first processor 104a can access. In this case, the data identifies the third memory device 104c. The memory barrier generator 306 checks the status bit in the third status register 307c for the first processor 102a to determine whether the third memory device 104c has an unexecuted memory access request from the first processor 102a. If so, the memory barrier generator 306 sends a memory barrier to the third memory device 104c. Otherwise, the memory barrier for the third memory device 104c is suppressed.

Returning to FIG. 3, logic 308 in the controller 208 may be used to monitor feedback from the memory devices for memory barrier acknowledgements. A "memory barrier acknowledgement" is a signal from a memory device indicating that every memory access request received by that memory device from the originating processor issuing the strongly-ordered request that precedes the memory barrier has been executed. The data from the second input register 304 and the status bits from the status registers 307a-307c are used by the logic 308 to determine which memory devices need to be monitored for memory barrier acknowledgements. When the logic 308 determines that all memory barrier acknowledgements have been received, it generates a trigger that is used to release the corresponding memory access request from the bus register 202. More specifically, the memory attribute from the first input register 302 is provided to the select input of a multiplexer 310. The multiplexer 310 is used to couple the trigger generated by the logic 308 to the bus register 202 when the memory attribute indicates that the memory access request is strongly-ordered. The trigger output from the multiplexer 310 is also coupled to the decoder to synchronize the timing of the bus switch 206 (see FIG. 2).

Once the memory access request is released from the bus register, it is routed to the target memory device through the bus switch 206 (see FIG. 2). A second multiplexer 312 in the controller 208 may be used to delay the release of data from the first and second registers 302, 304 until a memory access acknowledgement is received from the target memory device when a memory attribute indicating a strongly-ordered request is applied to the select input. As discussed earlier, the memory attribute included in the memory access request enforces an ordering constraint on the target memory device. Namely, the target memory device executes all outstanding memory access requests issued by the originating processor before executing the strongly-ordered memory access request. A memory access acknowledgement is generated by the target memory device following the execution of the strongly-ordered request. The memory access acknowledgement is fed back to the multiplexer 312 in the controller 208, where it is used generate a trigger to release new data from the first and second register 302, 304 corresponding to the next memory access request in the bus register 202. If the new data includes a memory attribute indicating that the corresponding memory access request in the bus register 202 is strongly-ordered, then the same process is repeated. Otherwise, the memory access request can be released immediately from the bus register 202.

The controller 208 is configured to immediately release a memory access request from the bus register 202 when the corresponding memory attribute in the first input register 302 indicates that the request is not strongly-ordered. In that case, the memory attribute is used to disable the memory barrier generator 306. In addition, the memory attribute forces the multiplexer 310 into a state which couples an internally generated trigger to the bus register 202 to release the memory access request. The memory access request is released from the bus register 202 and coupled to the target memory device through the bus switch 206 (see FIG. 2). The data corresponding to the next memory access request is then released from the first and second registers 302, 304 by an internally generated trigger output from the second multiplexer 312 in the controller 208.

Figure 4:
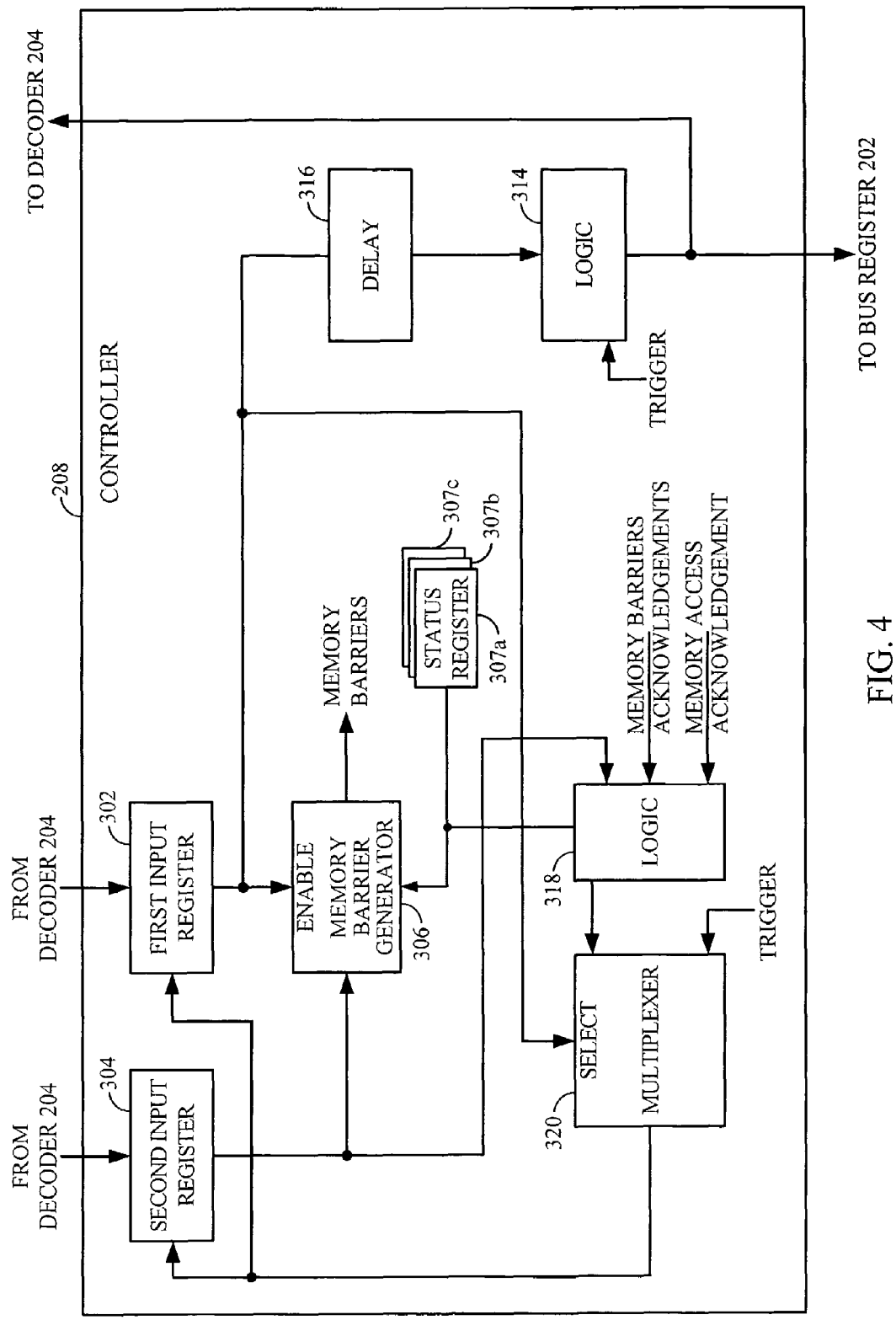
FIG. 4 is a functional block diagram illustrating another example of the controller in a bus interconnect for a weakly-ordered processing system.

FIG. 4 is a functional block diagram illustrating another example of a controller in a bus interconnect for a weakly-ordered processing system. In this example, a strongly-ordered memory access request is released from the bus register 202 by the controller 208 at the same time the memory barriers are provided to the appropriate memory devices. More specifically, the first input register 302 is used to provide a memory attribute for a memory access request to the memory baffler generator 306. If the memory attribute indicates that the corresponding memory access request is strongly-ordered, then the memory barrier generator 306 is enabled. When the memory baffler generator 306 is enabled, the data from the second input register 304 is used to identify each memory device accessible by the originating processor, other than the target memory device. For each memory device identified, the memory barrier generator 306 checks that status bit for the originating processor in the status registers 307a-307c. A memory barrier is then generated for each memory device, other than the target memory device, that may have an unexecuted memory access request from the originating processor.

With the memory barrier generator 306 enabled, logic 314 in the controller 208 may be used to prevent subsequent memory access requests from being released from the bus register 202 until the strongly-ordered request is executed by the target memory device. A delay 316 may be used to allow an internally generated trigger to release the strongly-ordered memory request from the bus register 202 before the trigger is gated off by the memory attribute. In this way, the memory access request can be provided to the target memory device concurrently with the memory barriers for the remaining memory devices accessible by the originating processor.

Logic 318 may be used to monitor feedback from the memory devices for the memory access acknowledgement from the target memory device, and the memory barrier acknowledgements. The data from the second input register 304 and the status bits from the status registers 307a-307c are used by the logic 318 to determine which memory devices need to be monitored for memory barrier acknowledgements. When the logic 318 determines that the various acknowledgements have been received, it generates a trigger to release new data from the first and second input registers 302, 304 corresponding to the next memory access request in the bus register 202. The trigger is coupled through a multiplexer 320 which is forced into the appropriate state by the memory attribute from the first input register 202. If the new data includes a memory attribute indicating that the corresponding memory access in the bus register 202 is strongly-ordered, then the same process is repeated. Otherwise, the memory access request can be released immediately from the bus register 202 with an internally generated trigger via the logic 314. An internally generated trigger may also be coupled through the multiplexer 320 to release the data from the first and second input registers 302, 304 for the next memory access request in the bus register 202.

The manner in which the status bits are set may vary depending on the particular application and the overall design constraints imposed on the processing system. By way of example, the status bit for an originating processor and a first target memory device may be cleared when a memory access request issued by the originating processor and destined for the first target memory device is released from the bus register. Once the status bit is cleared, a subsequent strongly-ordered request issued by the originating processor to a second target memory device will result in a memory barrier being sent to the first target memory device. The status bit will remain cleared until the memory access request to the first target memory device is executed. Feedback from the first target memory device may be used to assert the status bit. Once the status bit is asserted, a subsequent strongly-ordered request issued by the originating processor to a third target memory device will cause the memory barrier generator to suppress the memory barrier that would otherwise be sent to the first target memory device.

The example in the preceding paragraph assumes that the first target memory device generates feedback following the execution of the memory access request. However, in some processing systems, the memory devices may not provide feedback for weakly-ordered requests. In other processing systems, the feedback may indicate only that the memory access request has been written into a buffer in the target memory device. In the latter case, the feedback from the target memory device cannot be used to assert the corresponding status bit because it may not be until some time later that the memory access request is actually executed. In these processing systems, another methodology is needed to set the status bits.

In one embodiment of the processing system, the memory barriers can be used to set the status bits. In this embodiment, the memory barriers generated by the memory barrier generator for strongly-ordered requests may be used to assert the corresponding status bits. The status bit for the strongly-ordered request may also be asserted when the request is released from the bus register. Each status bit will remain asserted until a corresponding weakly-ordered request is subsequently released from the bus register.

Referring to FIGS. 1-4, an example will now be provided to illustrate the functionality of this latter embodiment. In this example, the processing system may be configured such that the first processor 102a can access the first and third memory devices 104a, 104c. When a strongly-ordered request issued by the first processor 102a to the first memory device 104a is at the output of the bus register 202, the memory barrier generator 306 generates a memory barrier for the third memory device 104c, assuming that the status bit for the first processor 102a in the third status register 307c is cleared. The status bit for the first processor 104a in the first status register 307a is asserted when the strongly-ordered request is released from the bus register 202. A signal (not shown) from the decoder 204 may be used to assert this status bit. In addition, the status bit for the first processor 102a in the third status register 307c is asserted when the memory barrier is sent to the third memory device 104c.

Once the strongly-ordered request is complete, the next request can be released from the bus register 202. In this example, the next request is a strongly-order request issued by the first processor 102a for the third memory device 104c. The memory barrier generator 306 uses the data from the second input register 304 to identify the memory devices, other than the target memory device, that the first processor 102a can access, i.e., the first memory device 104a. The status bit for the first processor 102a in the first status register 307a is used by the memory barrier generator 306 to suppress the memory barrier to the first memory device 104a. The strongly-ordered request issued by the first processor 102a to the third memory device 104c can then be released from the bus register 202. The status bits in the first and third status registers 307a, 307c for the first processor 102a remain asserted.

The next request in the bus register 202 in this example is a weakly-ordered request issued by the first processor 102a to the first memory device 104a. This request can be released immediately from the bus register 202 to the first memory device 104a. The decoder 204 may be used to control the bus switch 206 at the output to the bus register 202, and at the same time, provide a signal to the controller 208 to clear the status bit for the first processor 102a in the first status register 307.

A strongly-ordered request issued by the first processor 102a to the third memory device 104c is the next request in the bus register 202 in this example. The memory barrier generator 306 uses the data from the second input register 304 to identify the memory devices, other than the target memory device, that the first processor 102a can access, i.e., the first memory device 104a. The status bit for the first processor 102a in the first status register 307a is cleared, and therefore, a memory barrier is generated for the first memory device 104a. The status bit for the first processor 104a in the first status register 307a is reasserted when the memory barrier is sent to the first memory device 104a. The status bit in the third status registers 307c for the first processor 102a remains asserted when the strongly-ordered request is released from the bus register 202.

The previous description is provided to enable any person skilled in the art to practice the various embodiments described herein. Various modifications to these embodiments will be readily apparent to those skilled in the art, and the generic principles defined herein may be applied to other embodiments. Thus, the claims are not intended to be limited to the embodiments shown herein, but is to be accorded the full scope consistent with the language claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A weakly-ordered processing system, comprising:
a plurality of memory devices;
a plurality of processors, each of the processors to generate memory access requests to one or more of the memory devices; and
a bus interconnect to interface the processors to the memory devices, the bus interconnect further to enforce an ordering constraint for a strongly-ordered memory access request from an originating processor to a target memory device by sending a memory barrier to each memory device that is not the target memory device and that is accessible by the originating processor, except for those memory devices that have no unexecuted memory access requests from the originating processor, the bus interconnect further to receive a memory barrier acknowledgement from each memory device that is not the target memory device and to send the strongly-ordered memory access request to the target memory device after the memory barrier acknowledgment is received from each memory device that is not the target memory device.

2. The weakly-ordered processing system of claim 1, wherein each memory device that is not the target memory device and that receives a memory barrier is to execute any unexecuted memory access requests from the originating processor.

3. The weakly-ordered processing system of claim 1, wherein the bus interconnect is further to control a signal to each memory device that is not the target memory device and that is accessible by the processor, and to confirm which memory devices do not have any unexecuted memory access requests from their respective signals.

4. The weakly-ordered processing system of claim 3, wherein the bus interconnect is further to force the signal for one of the memory devices that is not the target memory device and that is accessible by the processor into a first state in response to a memory barrier for the originating processor being sent by the bus interconnect to said one of the memory devices, the bus interconnect further to confirm that said one of the memory devices does not have any unexecuted memory access requests when the signal is forced into the first state.

5. The weakly-ordered processing system of claim 4, wherein the bus interconnect is further to force the signal into a second state in response to a weakly-ordered memory access request from the originating processor to said one of the memory devices.

6. The weakly-ordered processing system of claim 3, wherein the bus interconnect is further to force the signal to one of the memory devices that is not the target memory device and that is accessible by the processor into a first state in response to feedback from the said one of the memory devices that there are no unexecuted memory access requests from the originating processor to said one of the memory devices, the bus interconnect further to confirm that said one of the memory devices does not have any unexecuted memory access requests when the signal is forced into the first state.

7. The weakly-ordered processing system of claim 6, wherein the bus interconnect is further to force the signal into a second state in response to a weakly-ordered memory access request from the originating processor to said one of the memory devices.

8. The weakly-ordered processing system of claim 1, wherein the bus interconnect is further to enforce an ordering constraint for a strongly-ordered memory access request from an originating processor to the target memory device by sending the strongly-ordered memory access request along with a memory attribute to the target memory device, the memory attribute indicating that the memory access request is strongly-ordered.

9. A weakly-ordered processing system, comprising:
a plurality of memory devices;
a plurality of processors, each of the processors to generate memory access requests to one or more of the memory devices; and
a bus interconnect having:
means for interfacing the processors to the memory devices; and
means for enforcing an ordering constraint of a strongly-ordered memory access request from an originating processor to a target memory device, the means for enforcing including:
means for sending a memory barrier to each memory device that is not the target memory device and that is accessible by the processor, except for those memory devices that have no unexecuted memory access requests from the originating processor;
means for receiving a memory barrier acknowledgement from each memory device that is not the target memory device; and
means for sending the strongly-ordered memory access request to the target memory device after receiving the memory barrier acknowledgement from each memory device that is not the target memory device.

10. A bus interconnect, comprising:
a bus switch to interface a plurality of processors to a plurality of memory devices in a weakly-ordered processing system, wherein each of the processors is to generate memory access requests to one or more of the memory devices; and
a controller to enforce an ordering constraint for a strongly-ordered memory access request from an originating processor to a target memory device by sending a memory barrier to each memory device that is not the target memory device and that is accessible by the originating processor, except for those memory devices that have no unexecuted memory access requests from the originating processor, the controller further to receive a memory barrier acknowledgement from each memory device that is not the target memory device and to send the strongly-ordered memory access request to the target memory device after the memory barrier acknowledgment is received from each memory device that is not the target memory device.

11. The bus interconnect of claim 10, wherein the controller is further to control a signal to each memory device that is not the target memory device and that is accessible by the processor, and confirm which of those memory devices do not have any unexecuted memory access requests from their respective signals.

12. The bus interconnect of claim 11, wherein the controller is further to force the signal to one of the memory devices that is not the target memory device and that is accessible by the processor into a first state in response to a memory barrier for the originating processor being sent by the bus interconnect to said one of the memory devices, the controller further to confirm that said one of the memory devices does not have any unexecuted memory access requests when the signal is forced into the first state.

13. The bus interconnect of claim 12, wherein the controller is further to force the signal into a second state in response to a weakly-ordered memory access request from the originating processor to said one of the memory devices.

14. The bus interconnect of claim 11, wherein the controller is further to force the signal for one of the memory devices that is not the target memory device and that is accessible by the processor into a first state in response to feedback from the said one of the memory devices that there are no unexecuted memory access requests from the originating processor to said one of the memory devices, the controller further to confirm that said one of the memory devices does not have any unexecuted memory access requests when the signal is forced into the first state.

15. The bus interconnect of claim 14, wherein the controller is further to force the signal into a second state in response to a weakly-ordered memory access request from the originating processor to said one of the memory devices.

16. A method of enforcing strongly-ordered memory access requests in a weakly-ordered processing system, comprising:
receiving, from a plurality of processors, memory access requests for a plurality of memory devices, one of the memory access requests from an originating processor to a target memory device being a strongly-ordered memory access request;
sending a memory barrier to each memory device that is not the target memory device and that is accessible by the originating processor, except for those memory devices that have no unexecuted memory access requests from the originating processor;
receiving a memory barrier acknowledgement from each memory device that is not the target memory device; and
sending the strongly-ordered memory access request to the target memory device after receiving the memory barrier acknowledgment from each memory device that is not the target memory device to enforce an ordering constraint for the strongly ordered memory access request.

17. The method of claim 16, wherein the strongly-ordered request is enforced by controlling a signal for each memory device that is not the target memory device and that is accessible by the processor, and confirming which of those memory devices do not have any unexecuted memory access requests from their respective signals.

18. The method of claim 17, wherein the strongly-ordered request is enforced by forcing the signal to one of the memory devices that is not the target memory device and that is accessible by the processor into a first state in response to a memory barrier for the originating processor being sent by the bus interconnect to said one of the memory devices, the confirmation that said one of the memory devices does not have any unexecuted memory access requests based on the signal being forced into the first state.

19. The method of claim 18, wherein the strongly-ordered request is enforced by forcing the signal into a second state in response to a weakly-ordered memory access request from the originating processor to said one of the memory devices.

20. The method of claim 17, wherein the strongly-ordered request is enforced by forcing the signal to one of the memory devices that is not the target memory device and that is accessible by the processor into a first state in response to a feedback from the said one of the memory devices that there are no unexecuted memory access requests from the originating processor to said one of the memory devices, the confirmation that said one of the memory devices that is not the target memory device does not have any unexecuted memory access requests based on the signal being forced into the first state.

21. The method of claim 20, wherein the strongly-ordered request is enforced by forcing the signal into a second state in response to a weakly-ordered memory access request from the originating processor to said one of the memory devices.

* * * * *